Nov. 28, 1939.    J. A. COOK    2,181,756
AUTOMATIC WEIGHING BAG FILLER
Filed Aug. 5, 1938    4 Sheets-Sheet 1
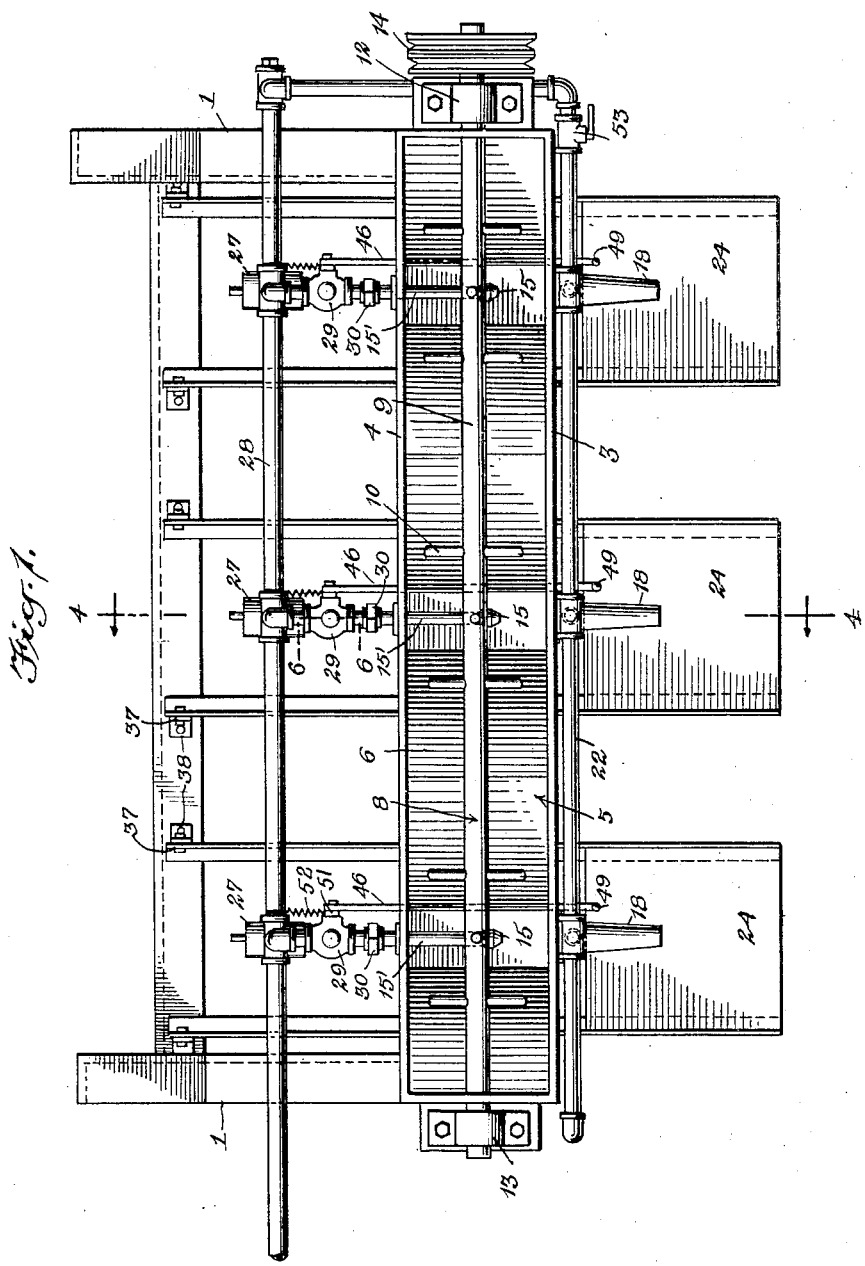
WITNESSES
INVENTOR
John A. Cook
BY
Munn, Anderson & Liddy
ATTORNEYS

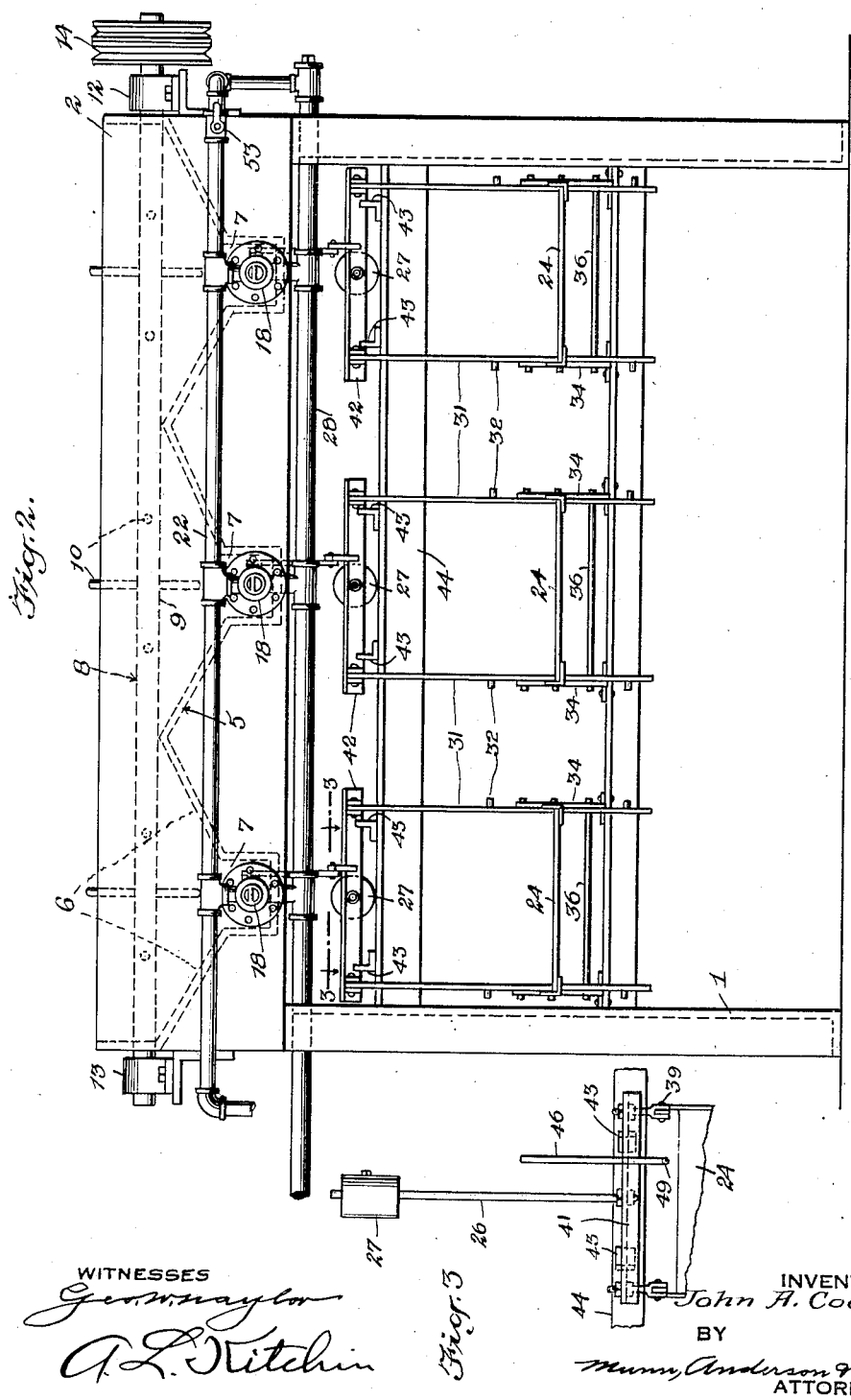

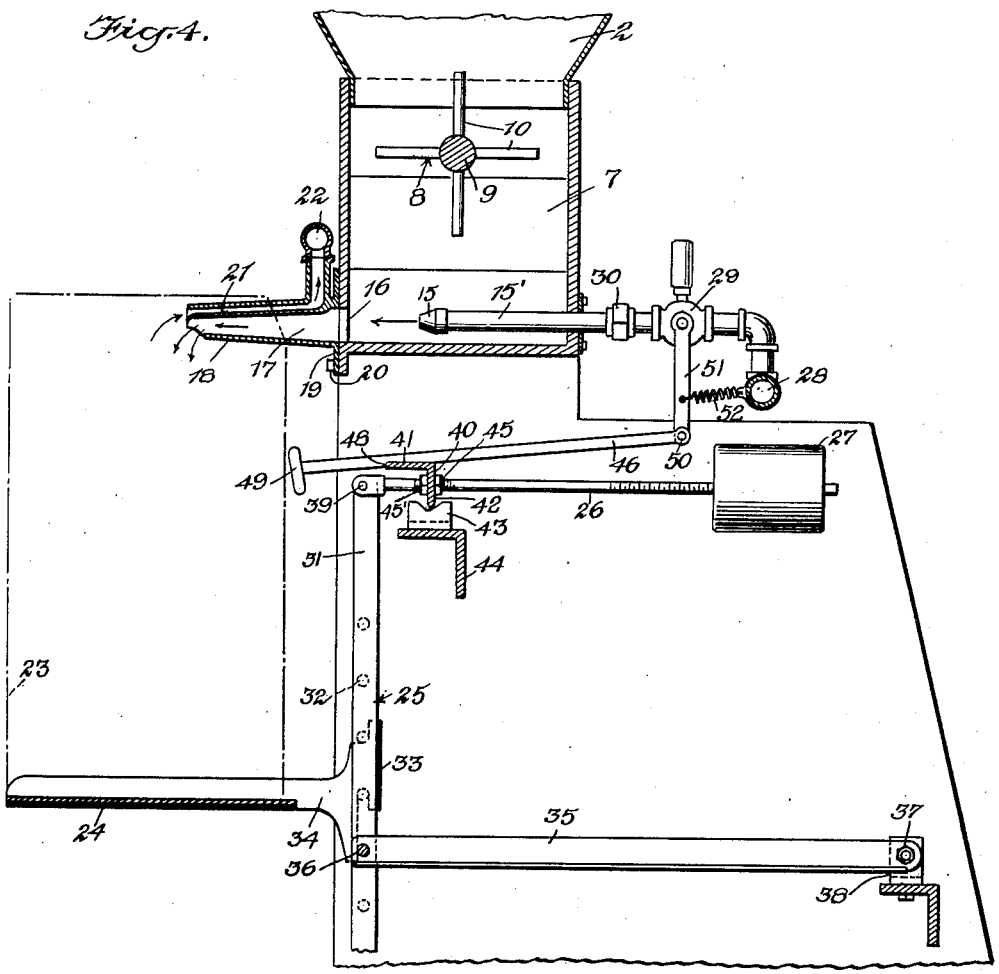

Nov. 28, 1939.   J. A. COOK   2,181,756
AUTOMATIC WEIGHING BAG FILLER
Filed Aug. 5, 1938   4 Sheets-Sheet 4
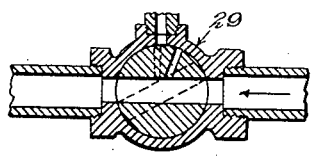
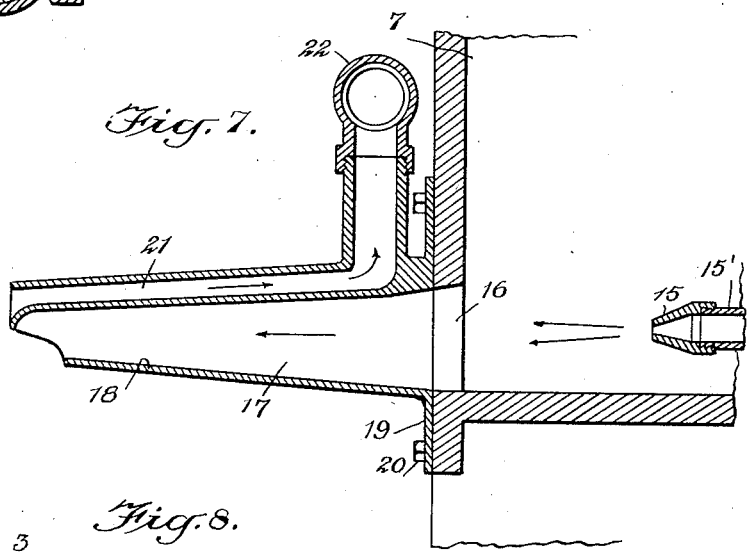
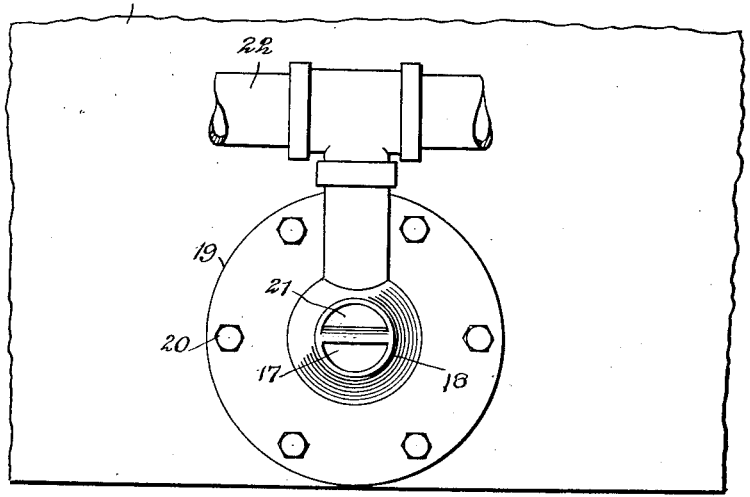
INVENTOR
John A. Cook
BY
ATTORNEYS Patented Nov. 28, 1939

2,181,756

UNITED STATES PATENT OFFICE 2,181,756

AUTOMATIC WEIGHING BAG FILLER

John A. Cook, McAfee, N. J.

Application August 5, 1938, Serial No. 223,146

3 Claims. (Cl. 249—61)

This invention relates to bag fillers and has for an object to provide a construction which may be used to fill any desired kind of bag, but particularly what are known as valve bags, an object being to provide a construction which will quickly and accurately fill bags with a certain weight of material.

Another object of the invention is to provide a bag-filling structure wherein air is blown into the bag with the material so as to inflate the bag whereby the desired quantity may be inserted.

A further object of the invention is to provide an improved bag-filling device which is formed with an automatically acting scales structure for shutting off the filling means when the correct amount of material has been inserted into the bag.

A further object, more specifically, is to provide a bag-filling machine having one or more hoppers, with means for stirring the material and means for directing the material under air pressure into a bag, the filling structure being associated with scales which will automatically shut off the air when the bag has been filled to the desired extent.

In the accompanying drawings—

Fig. 1 is a top plan view of a bag-filling machine disclosing an embodiment of the invention;

Fig. 2 is a side elevation of the structure shown in Fig. 1;

Fig. 3 is a fragmentary detail top plan view of part of the scales shown particularly in Fig. 4;

Fig. 4 is a fragmentary sectional view through Fig. 1, approximately on the line 4—4;

Fig. 5 is a fragmentary view principally in elevation illustrating the scale beam and associated parts when the scale beam is in a raised position;

Fig. 6 is a fragmentary sectional view through Fig. 4, approximately on the line 6—6;

Fig. 7 is an enlarged vertical sectional view through the filling tube shown in Fig. 4;

Fig. 8 is a front elevation of the structure shown in Fig. 7.

Referring to the accompanying drawings by numerals, 1 indicates a framework which may be of angle iron or other suitable material and provided with suitable braces and acting to support the hopper 2. The hopper 2, as illustrated in Figs. 1 and 2, is provided with a pair of upstanding side walls 3 and 4 and a trough 5 having pairs of inclined surfaces 6, each pair of inclined surfaces discharging into a feed chamber 7, there being three feed chambers illustrated in Figs. 1 and 2, though if desired there could be a greater or less number without departing from the spirit of the invention.

The hopper 2 is adapted to receive material to be bagged from any suitable source, as for instance a storage bin (not shown). The material being bagged may be lime, flour, grain, or other material, which may be readily stirred and may be removed through the action of an air jet. A stirring device 8 is arranged to extend longitudinally through the hopper tube, as shown particularly in Fig. 1. This stirring device consists principally of a central shaft 9 having a number of arms or pins 10 extending therefrom. The shaft 9 is suitably supported by journal members 12 and 13 and one or more pulleys 14 are connected to one of the ends of the shaft so that power belts may be connected therewith for driving the stirring device. Preferably the stirring device is rotating rather slowly continually while the bag filler is in use. This loosens up the material properly so that when air is being discharged from the nozzle 15 it may carry with it the material to be fed into the bag. As the various feed chambers 7 and parts associated therewith are identical a description of one will apply to all.

As shown in Fig. 4, the chamber 7 is provided with a discharge opening 16 and the nozzle 15 is positioned to discharge centrally through the opening 16 and into the passageway 17 of the filling tube 18. This tube is preferably made from metal and is provided with a flange 19 held in place by suitable bolts 20. It is to be understood that different size tubes 18 may be used but all the flanges 19 are of the same size so that the same bolts 20 may be used to secure them in place as desired.

The hopper 2 is provided not only with the air and material passage 17 but a return passageway 21. The return passageway 21 is connected with a tube 22 leading to a suitable discharge point, preferably a dust bin (not shown); also preferably there is a check valve (not shown) provided in tube 22 to prevent any back pressure entering the bag.

In Fig. 4 is will be seen that there is provided a bag 23 which is an ordinary well-known bag of the filling type. This form of bag is substantially airtight when the tube 18 is inserted into the valve. After the bag has been filled it is pulled off the nozzle and the valve will automatically close so as to prevent any spillage. When a new bag is placed on the platform 24 of the scales 25, the scale beam 26 will remain lowered, as shown in Fig. 4, until enough material has been inserted in the bag 23 to overbalance the scale beam 26 and the weight 27, as illustrated particularly in Fig. 5.

It will be noted that air is supplied from a pump, reservoir, or other suitable source, under some desired pressure through an air supply pipe 28. This pipe is connected to an air tube 15' through an air valve 29 and union 30. Usually a conventional air valve now in the market is used, as for instance the well-known whistle air valve. This valve is constructed substantially as shown in Fig. 6. When the valve 29 is in the position shown in Figs. 4 and 6, air is passing through the tube 15' and nozzle 15 so as to blow some of the material from the chamber 7 into and through the passageway 17. The material in chamber 7 is maintained in loose condition by the stirring member 8, but all material fed into bag 23 is forced therein by air from the nozzle 15. The air continues to blow material into bag 23 from chamber 7 until a sufficient amount of material is forced into the bag and the scales 25 function, whereupon the platform 24 will be lowered and a certain action will take place as hereinafter mentioned. During the forcing of material into the bag, air will fill the bag and cause the same to be distended fully so that the material may readily settle to the bottom and the air at the top may pass out through the passageway 21 into pipe 22. Usually a certain amount of dust moves with this return air and this dust is directed by pipe 22 to a discharge point, as for instance a bin (not shown). When the platform 24 moves downwardly by reason of the weight of the material in the bag 23, the movement is very small and the more or less loose connection between the tube 18 and the bag readily permits this movement.

As shown in Fig. 4, the scales 25 are formed with a vertical bar 31 having a number of spaced pins 32 for engaging with the extension 33 of the respective supporting bars 34 which carry the platform 24. The extension 33 may be arranged between any two pins 32, according to the height that is desired for the platform 24. A bar 35 is pivotally mounted at 36 to the vertical bar 31 and also pivotally mounted at 37 on a fixed supporting bracket 38. The scale beam 26 is pivotally mounted at 39 to the upper end of bar 31. An L-shaped member 40 is provided, as shown in Fig. 4, and formed with a leg 41 acting as a catch, the leg 42 acting as a knife edge or pivotal member resting on a pivotal block 43 carried by a stationary bar 44 forming part of the frame of the device. Nuts 45 and 45' clamp the leg or pivotal member 42 rigidly to the scale beam 26 so that all these members will move as a unit. A pull rod 46 is provided having a notch 48 adapted to receive the catch 41, as shown in Fig. 4. This pull rod is provided with a hand-hold 49 whereby the rod may be manually reciprocated as desired. When rod 46 is pivotally connected at 50 with a valve lever 51 secured to the key or valve plug of valve 29. A retractile spring 52 is connected with lever 51 and with any stationary support, as for instance the pipe 28. This spring has a continuous tendency to swing lever 51 sufficiently to close valve 29. When the bag is being filled catch 41 prevents this swinging movement but as soon as the bag has been filled the scale beam 26 will swing upwardly and this will swing the outer end of catch 41 downwardly to the position shown in Fig. 5 whereby rod 46 will be released and spring 52 will be allowed to function. This quickly closes the valve and shuts off the air passing out nozzle 15, whereupon no additional material can be fed into the bag so that the bag will be accurately filled but no excess material will be placed in the bag. When this occurs the device ceases to function and remains inoperative until rod 46 is moved manually to the position shown in Fig. 4. This is not done until after the filled bag has been removed and a new bag provided. After a new bag has been arranged as shown in dot-and-dash lines in Fig. 4, the operator grasps the handle 49 and moves the rod 46 and associated parts from the dotted position shown in Fig. 5 to the position shown in Fig. 4. As soon as this occurs air will immediately blow material into the new bag and will function until the new bag is provided with a sufficient weight of material to cause the scales to again function. As soon as the scales again function to shut off the air no more material can be forced into the bag. If the operator pays no attention to the device it will remain in this non-functioning position without any adjustment or consideration by the operator. If the operator should move the filled bag over the platform 24 the device still would function and the operator may leave the machine even though the pipe 28 is still supplied with air under pressure.

Ordinarily three or four of the devices as shown in Fig. 2 are sufficient to keep one operator reasonably busy removing filled bags and providing empty bags. Any time the operator neglects any of the devices as shown in Fig. 2 that particular device will fill a bag and then cease to function and will remain in non-functioning position until manually reset by the construction just described.

It will be noted that the full weight of material will be provided for each bag but there will be no wasted material by putting an unnecessary amount of material in any bag. In addition, it will be noted that fine dust will be transported to a distant point so that the operator may work under sanitary conditions at all times even though he is handling lime, wheat, or other material that might produce an undesirable dust.

Preferably the supply pipe 28 is provided with a valve 53, as shown particularly in Figs. 1 and 2, whereby the supply of air and pressure through the various valves 29 may be shut off. This is desirable when leaving the machine during lunch periods or at night when the machine is shut down.

I claim:

1. A bag filler including a hopper for supplying material to be fed into a bag, a nozzle connected with said hopper having a passageway for directing material from the hopper to the interior of the bag to be filled, an air nozzle for forcing material from said hopper to said filling tube, means for supplying air under pressure to the nozzle, a valve for controlling said air, a lever connected with said valve for opening and closing the same, a spring acting on said lever tending to close the valve, a rod pivotally connected to said lever and provided with a notch, said rod being adapted to be pulled manually for opening said valve against the action of said spring, an L-shaped member having one leg acting as a catch fitting into said notch when said valve is open, means pivotally supporting the other leg of said L-shaped member, a scale beam rigidly connected to said other leg, said scale beam being provided with an adjustable weight, a vertically extending bar connected to said scale beam at the end opposite said weight, a platform carried by said vertically extending bar acting as means for supporting the bag which is being filled, and a bar pivoted at one end to the vertical bar and at the other end to a fixed support, whereby said vertically extending bar may move upwardly and downwardly substantially in a straight line, said scale beam with its weight swinging upwardly when a predetermined weight has been provided in the bag being filled, whereby said L-shaped member may swing to a position out of said notch so as to permit said spring to function automatically for closing said valve.

2. A bag filler including a filling tube having a filling passageway and an air passageway, a hopper for directing material to the entrance of said filling tube, a nozzle for directing air to said filling tube for causing material in the hopper to pass through the filling tube into the bag to be filled, means for directing air to said nozzle, a valve positioned to control the passage of air through said nozzle, a platform for receiving a bag to be filled, a scale having a vertical bar, means on said vertical bar adjustably supporting said platform whereby the platform may be adjusted toward and from said filling tube to accommodate bags of different heights, said scale having a tilting bar, a catch carried by said tilting bar, a spring connected with said valve tending to close the valve, and a hand-actuated rod connected with said valve for opening the valve, said hand-actuated rod having a notch positioned to receive said catch when said valve is open whereby when the bag on the platform receives enough material to cause said tilting bar to tilt said catch will be moved out of said notch and said spring will close said valve.

3. A bag filler including a filling tube, a hopper positioned to discharge material into said tube, an air nozzle extending into said hopper for forcing material from the hopper through said tube, means for directing air under pressure to said nozzle, a valve controlling the passage of air through said nozzle, a spring tending to move said valve to a closed position, a hand-actuated rod connected with said valve and adapted to be pulled manually against the action of said spring for opening said valve, said rod having a notch, a catch adapted to fit into said notch when the valve is in open position, a scale provided with a vertically moving bar and a tilting bar, said catch being connected with the tilting bar so that when the tilting bar has been swung in a given direction said catch will be moved out of said notch for releasing said valve, a platform for supporting a bag so that it will receive material from said filling tube, a plurality of spaced pins carried by said vertically moving rod forming part of said scale, and means extending from said platform having interlocking portions adapted to interlock with any three of said pins, said interlocking portion being adapted to be shifted upwardly and downwardly along said vertically moving rod to vary the distance of said platform from said filling nozzle whereby bags of different heights may be filled.

JOHN A. COOK.